US008758554B2

United States Patent
Miller

(10) Patent No.: US 8,758,554 B2
(45) Date of Patent: Jun. 24, 2014

(54) CLAMPING TAPE FOR FURNITURE AND RELATED REPAIRS

(75) Inventor: Joseph T. Miller, St. Louis, MO (US)

(73) Assignee: MOCAP L.L.C., Park Hills, MO (US)

( * ) Notice: Subject to any disclaimer, the term of this patent is extended or adjusted under 35 U.S.C. 154(b) by 46 days.

(21) Appl. No.: 13/507,155

(22) Filed: Jun. 8, 2012

(65) Prior Publication Data

US 2012/0255674 A1 Oct. 11, 2012

Related U.S. Application Data

(63) Continuation of application No. 12/322,785, filed on Feb. 6, 2009.

(60) Provisional application No. 61/066,298, filed on Feb. 19, 2008.

(51) Int. Cl.
*B32B 38/10* (2006.01)

(52) U.S. Cl.
USPC .......... 156/719; 156/767; 156/160; 156/162; 156/184; 156/189; 156/229; 156/247

(58) Field of Classification Search
None
See application file for complete search history.

(56) References Cited

U.S. PATENT DOCUMENTS

| | | |
|---|---|---|
| 2006/0035020 A1 | 2/2006 | Hennen |
| 2006/0228480 A1 | 10/2006 | Lin |
| 2007/0256365 A1 | 11/2007 | Petty |
| 2008/0251201 A1 | 10/2008 | Sikkel et al. |

*Primary Examiner* — Mark A Osele
*Assistant Examiner* — Nickolas Harm
(74) *Attorney, Agent, or Firm* — Paul M. Denk

(57) ABSTRACT

A silicone tape having inherent elasticity and flexibility to allow for its significant stretching, which when unrolled from its tape roll, and its laminar film removed, can be stretched around the furniture or other componentry to hold it in position until any applied adhesive hardens, during furniture repair or manufacture.

1 Claim, 1 Drawing Sheet

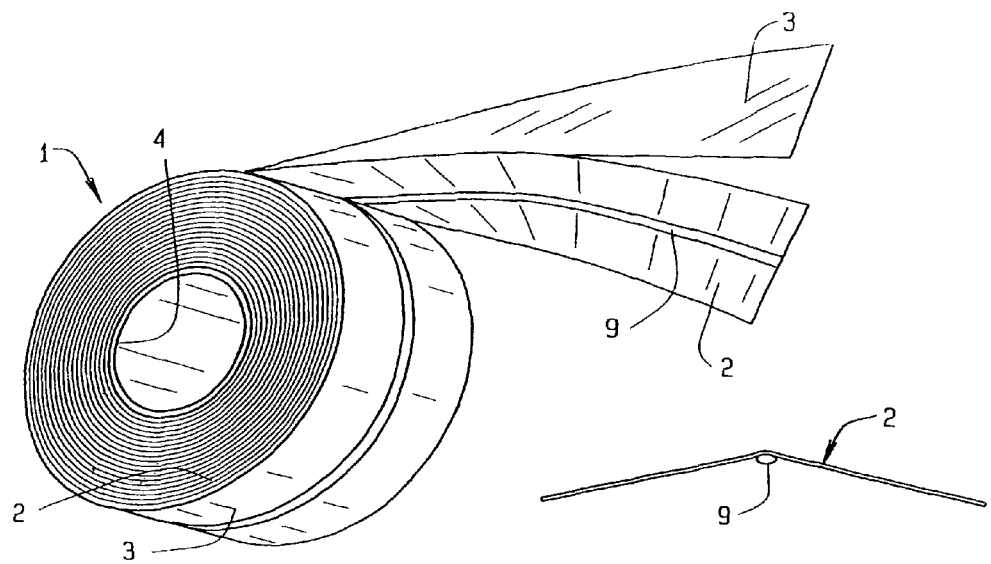
FIG. 1 FIG. 1A
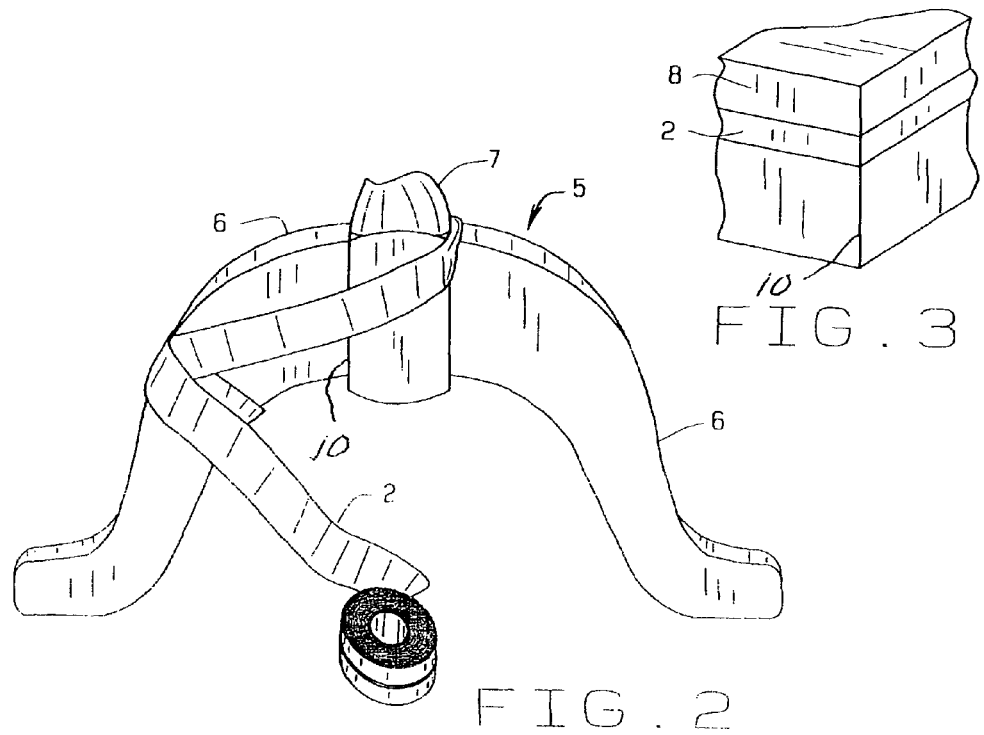
FIG. 3
FIG. 2

CLAMPING TAPE FOR FURNITURE AND RELATED REPAIRS

CROSS REFERENCE TO RELATED APPLICATION

This continuation patent application claims priority to the non-provisional patent application having Ser. No. 12/322,785, filed on Feb. 6, 2009, which claims priority to the provisional patent application having Ser. No. 61/066,298, filed on Feb. 19, 2008.

FIELD OF INVENTION

This invention relates to a unique polymer tape, having both adherence characteristics and stretchability, and primarily for use in application and holding furniture and other components together while the woodwork is being glued or otherwise secured into a permanent connection.

BACKGROUND OF THE INVENTION

Numerous types of glues, clamps, brackets, and other types of holding means have long been available in the art, for holding furniture and other components together, primarily made of wood, but perhaps some plastic, while they are being affixed together, through the use of glue, into a permanent structure. Obviously, many types of tapes have been available for holding parts together, such as the Scotch Brand tape, which is used for a myriad of purposes. But, normally, that type of tape generally has uses for securing segments together, such as when gift wrapping, and trail ends of the wrapping paper needed to be affixed to the packaging, as prepared. Other types of tapes, such as duct tapes, are available for holding, reasonably permanently, various parts of duct work, and other components together after being secured into a connected relationship.

The current invention is designed to add another dimension to the use of a highly stretchable tape, having sufficient elasticity, so it can be draped around furniture, or other wooden components, and hold them together; after or as the parts are being glued and while waiting it's drying or hardening for securement of the furniture components together.

SUMMARY OF THE INVENTION

This invention contemplates the formation and use of a polymer tape that has some degree of adhesion, but also significant elasticity, and which can be subjected to significant tension, so as to apply a force primarily to furniture components as they are being glued during manufacture, or when being repaired as a result of breakage.

More specifically, the clamping tape of this invention is a form of a tape functioning as a clamp and wrap, which is designed for wrapping around furniture components, and to hold them into their fastened relationship, until such time as any applied glue or other adhesive sets, or dries, either during furniture repair, or during its manufacture.

The concept of this invention is to simplify wood gluing with this new style of tape as a clamp concept. It eliminates the need for special clamp designs, clamps that can damage the finish upon furniture components, and secures the wooden pieces together until the adhesive dries. There are no weak bonds or gaps from wood movement, since the wood components are securely held together, until the adhesive binds. There is no real adhesive applied to the surface of the tape, so there is no affect upon the wood surface or finish of the furniture component, when held in place by means of this wrapping concept. Hence, there is no adhesive that needs to be cleaned up, after the furniture components have been securely fastened together. The tape of this invention is a soft silicone type of tape, which is inert to most furniture or other wooden finishes. The tape only sticks upon itself, and does not incorporate any type of superficial adhesive, that can connect onto the furniture surface, and leave any residue marks, or imperfections.

When gluing furniture parts together, and whether it be during their initial manufacture, or when a repair is made, the gluing application of holding such furniture parts together will be done as routinely performed at the factory, or even by the homeowner, or furniture owner, when repairing the same, and after the glue is applied, the tape wrap of this invention can be stretched, across the wood sections, to tightly adhere them together, into an affixed and permanent condition, while the glue hardens.

This tape includes inherent stretchability, normally exhibiting up to a 300% elastic stretch, which holds the furniture parts under tension, while the glue dries. Thus, when the furniture is being adhered together, this tape is simply stretched, but not over stretched, around the furniture components, to hold them into a fixed position, once adjusted into the desired and required configuration, and elastically holds the parts in place, until the adhesive secures them into a permanent bond. To hold the silicone tape wrap of this invention in place, it does have sufficient adherence upon itself, so that wrapping the tape around the furniture parts, and onto previously applied sections of the tape, causes the tape to adhere on itself, and hold the furniture parts into a fixed position, until the glue hardens. Once the glue does harden, the tape of this invention can be easily separated from the furniture parts, and simply thrown away, having completed its required work.

For most shapes of furniture, this tape can simply be stretched around the pieces of the wood, and back onto the tape itself, until such time as the furniture components are adhered into a more fixed position, to allow the adhesive to dry, and hold the furniture parts together, by glue adhesion. This tape only sticks upon itself, and when one applies it to the furniture parts, he/she only must hold the starting end of the tape in place, while stretching the tape around the furniture parts, sufficiently to hold all of the furniture structural components together, into the final configuration, until such time as the glue hardens. Merely a slight pressure of the tape upon itself, as it is secured, will hold it in position about the furniture components, while the glue dries. The furniture parts can be further moved and the tape stretched, to add further glue, or repositioning of the parts, and then released so the tape as stretched will shift the parts back into a desired position.

For example, when a table/chair leg requires repair, and it may have an unusual shape, which may not accommodate the normal type of clamping mechanical mechanism, one may simply stretch the tape of this invention around the furniture leg, and back onto itself, to secure it and hold it in position, until the applied adhesive dries. This anchors the furniture parts together, and the tape holds upon itself, after it has been stretched around the frame and back onto the furniture components, when applied. One needs only to press the tape and onto itself, to fix it in position, to hold the furniture parts together, during repair. Upon the glue drying, one needs only to cut the tape free, and remove it.

The tape of this invention is a silicone type of polymer tape, it is of a soft texture, it has significant elasticity, as previously reviewed, and the silicone tape only adheres and sticks to it, but not to the furniture parts. Other glues that are used for holding the furniture structure together, in the event there is any glue residual, does not bond to the silicone tape. Since there are no adhesives integrated into the structure of this tape wrap, there is no other secondary clean up that is required to remove any adhesive, from the tape, or from any furniture finish. And, the advantage of utilizing the tape of this invention is that it works on many unusual shapes of furniture or other wooden components, or even polymer parts, as their previously applied glue dries, which normally such furniture components may not otherwise be held together, by the usual one directional metal clamps, as normally in use.

The tape of this invention has a tensile strength, as tested, up to 600 psi, and it even is insulative to voltage, up to 400 volts/mil, and only fuses to itself, and holds in position, as applied. During general usage, the tape exhibits no adhesive, it will not melt when used at ambient temperature, and it remains flexible even to very low temperatures, and forms an air and water tight seal upon itself, when used for holding furniture structures together. As stated, the tape can stretch up to three times its length, when applied.

Furthermore, the unique tape of this invention, to assure its adequate functioning, when rolled into its usable form, as marketed, will further include an outer wrap of polyethylene, or other liner, so as to assure that the tape is not adhere upon itself, before usage. When the tape is ready for usage, the outer liner is simply removed, as the tape is stretched and applied, so as to minimize any interference from the liner, or other proximate compositions, when the tape is wrapped about furniture during a repair or manufacturing process.

It is, therefore, the principle object of this invention to provide a clamping type of silicone tape for use upon furniture and related products during their repair or manufacture.

It is another object of this invention is to provide a self adhering tape, which adheres on itself, after its outer liner is removed, as during application and usage.

Still another object of this invention is to provide a clamping tape that can be applied to furniture components by a sole person during repair or manufacture.

Still another object of this invention is to provide a clamping tape that has elastical stretch up to approximately 300% of its normal state.

Yet another object of this invention is to provide a silicone tape that can be applied to furniture parts, without tarnishing any surfaces to which the tape is applied.

Still another object of this invention is to provide a clamping tape that adheres upon itself, during usage.

Still another object of this invention is to provide a silicone clamping tape that can be used under even extreme conditions, for holding components together.

Another object of this invention is to provide a tape that does not incorporate any other adhesives, in its structure, when manufactured, or during usage.

Still another object of this invention is to provide a clamping tape that can be used upon unusual shapes of components or furniture parts so as to hold them into a fixed position during repair or manufacture.

These and other objects may become more apparent to those skilled in the art upon review of the summary of the invention as provided herein, and upon undertaking a study of the description of its preferred embodiment, in view of the drawings.

BRIEF DESCRIPTIONS OF THE DRAWINGS

In referring to the drawings:

FIG. 1 shows a perspective view of a roll of the clamp tape of this current invention, showing the tape, with its outer overlaying liner, as rolled upon its core;

FIG. 1a is a cross sectional view of the tape showing its angulated contouring;

FIG. 2 shows a view of a furniture part, with the clamping tape of this invention being applied thereon, for holding furniture parts together during their gluing; and FIG. 3 is a partial view of a wooden structure, such as a container or chest, held into position by means of the current tape while its adhesive is drying.

DESCRIPTION OF THE PREFERRED EMBODIMENT

In referring to the drawings, FIG. 1 provides a view of a roll 1 of the tape of this invention as it is being unrolled, as during usage. The tape includes the silicone polymer layer of tape 2 and has the outer liner of polyethylene or other film 3 laminated therewith, when applied into the roll form, so as to prevent the tape from adhering upon itself, until such time as it is used. The outer polymer liner is applied to the tape as it is rolled onto its core 4, and remains in that position until the tape is unwound from the roll, and the liner 3 is removed, as the tape 2 is being applied to an item of furniture, or other wooden or polymer components, as they are being glued together.

As can be seen in FIG. 2, the tape 2 is shown as it is applied about the pedestal or base 5 of the item of furniture, and designed to add stretchability inherently to it, as it holds the furniture legs 6 in place, as they are glued into position surrounding the table column 7 during its manufacture. The tape, because it is so flexible, can be secured in as many wraps as required to hold the furniture parts in place, during their assembly.

FIG. 3 shows how the tape 2 can be applied around a wooden box structure 8 and holds it into its formed configuration, during such time as the furniture glue that has been applied at the corners, hardens, as at 10, for the purpose of making the constructed box more permanent of structure. Usage of the tape under these conditions forms a complete binding of the parts together, and there are no weak bonds or gaps from any furniture movement, during the adhesive drying process. For most furniture shapes, one needs simply stretch the tape around the pieces of the wood, and back onto itself, for self adherence. As the tape only sticks to itself, one only needs to hold the starting end of the tape with a thumb or finger, while stretching the tape around the furniture components, and then wrapping the tape back onto itself, with the application of a slight pressure, to secure the tape into a holding position. After the glue dries, as at 10 in FIG. 2, one simply needs only to cut the tape free, and dispose of it.

As can also be seen for the tape as shown in FIG. 1, it has a color guideline 9 that runs centrally of its length, and the guideline furnishes a guide for winding of the tape when formed into the roll form, and as it is applied to furniture or other products, during its application, to assure its aligned application onto the parts being repaired. This guideline facilitates the winding of the tape so minimum overlapping is obtained while maximum physical and electrical properties are retained. Also, the tape has a slight triangular configuration, as shown in FIG. 1a, with the tape 2 slightly bowing laterally of the guideline 9 arranged centrally thereof. The guideline runs generally along the peak of the formed triangle, of the tape, as can be seen in cross section.

The tape of this invention has dielectric strength of approximately 300 VPM minimum. Its shore hardness is in the range of 50 plus or minus 10, by ASTM D2240 requirements. The tensile strength of the tape, by ASTM D412 standards, is approximately 600 to 700 psi minimum. The temperature range for this formed tape is between about −65° to 500° F. Its resistivity, by ASTM D991 standards, is approximately 13, with an ohm/cm minimum. Its adhesion tackiness, by ASTM standards, No. D2148 is 2 P.P.I. Its military specification is approximately MIL-1-46852C. Type II, A-A-59163. The above properties for the tape are as a guide only, and are not set forth for specification without testing by the user in its laboratory setting.

As is known, a silicone tape is made from the organic compound generally represented by R SUB 2 SIO, which is analogous to a ketone. It is an organic siloxane. It is part of a large group of polymerized organic siloxanes, that are unusually stable over a wide temperature range, that are obtained as oily fluids, resins, and elastomers converted into greases or other compounds, in this case, into a tape composition. It has a texture of a highly flexible polymer tape, or like a rubber form of tape, which in this particular instance, is for use for holding these furniture and other structural components together, during repair and manufacture.

Variations or modifications to the subject matter of this invention may occur to those skilled in the art upon review of this invention. Such modifications, if within the spirit of this development, are intended to be encompassed within the scope of the claims of any patent to issue hereon. The depiction of the invention in the drawings, and as explained in the specification, is set forth for illustrative purposes only.

I claim:

1. The process of applying a silicone clamping tape to temporarily clamp integral parts of furniture brought together during furniture repair or construction, and holding said furniture parts together until an applied adhesive has dried, including applying adhesive to the furniture parts in preparation for securing said furniture parts together, applying said silicone clamping tape to the furniture parts during furniture repair or construction to temporarily secure the parts together until the applied adhesive dries, continuously applying and overlapping said silicone clamping tape onto said previously applied same tape for adherence of said tape to itself, applying said tape and longitudinally stretching said overlapping clamping tape, providing said silicone clamping tape with a tensile stretching strength of approximately 700 psi, providing said clamping tape made from an organic siloxane when used for holding the furniture parts together, providing said silicone clamping tape with a separate and outer liner of polyethylene film laminated therewith and when applying said clamping tape to the furniture parts peeling of said liner from said clamping tape before application to said furniture parts, said silicone clamping tape having a guideline that runs approximately centrally of its length and which furnishes a guide for the application of said tape as it is applied to the furniture parts during usage, and applying said silicone clamping tape having significant elasticity to longitudinally stretch approximately 300% after peeling of its outer liner and subjecting it to significant longitudinal stretching as it is applied to the furniture parts and overlapping of previously applied tape for holding said furniture parts together while the applied adhesive dries during furniture repair or construction.

\* \* \* \* \*